United States Patent
Moschetti

(10) Patent No.: US 7,866,879 B2
(45) Date of Patent: Jan. 11, 2011

(54) IMMERSION BLENDER SPATULA RING

(76) Inventor: Mitchell R. Moschetti, 251 Cardinal Rd., Fletcher, NC (US) 28732

( * ) Notice: Subject to any disclaimer, the term of this patent is extended or adjusted under 35 U.S.C. 154(b) by 870 days.

(21) Appl. No.: 11/807,082

(22) Filed: May 24, 2007

(65) Prior Publication Data

US 2008/0043569 A1    Feb. 21, 2008

(51) Int. Cl.
    *A47J 43/044*     (2006.01)
(52) U.S. Cl. ..................... 366/129
(58) Field of Classification Search ........ 366/129, 366/344; 99/348; 138/96 R
See application file for complete search history.

(56) References Cited

U.S. PATENT DOCUMENTS

| | | | |
|---|---|---|---|
| 2,215,251 A | 9/1940 | Prince | |
| 3,299,924 A | 1/1967 | Hanschitz | |
| 4,575,255 A * | 3/1986 | Kafka | 366/129 |
| D314,489 S | 2/1991 | Van Deursen et al. | |
| D319,946 S | 9/1991 | Barrault | |
| D332,722 S | 1/1993 | Torbet et al. | |
| 5,366,286 A | 11/1994 | Rüttimann | |
| 5,368,384 A | 11/1994 | Duncan et al. | |
| 5,556,201 A | 9/1996 | Veltrop et al. | |
| 5,574,253 A | 11/1996 | Golob et al. | |
| 5,791,777 A | 8/1998 | Mak | |
| 5,863,118 A | 1/1999 | Ackels et al. | |
| 6,186,656 B1 | 2/2001 | Peñaranda et al. | |
| 6,283,627 B1 | 9/2001 | Fromm | |
| 6,676,285 B2 | 1/2004 | Qureshi | |
| 6,932,503 B2 | 8/2005 | Fallowes | |
| 6,974,244 B1 | 12/2005 | Lin | |
| 7,070,317 B2 | 7/2006 | King | |
| 7,371,003 B2 * | 5/2008 | Hamelin | 366/129 |
| 2002/0034121 A1 * | 3/2002 | Rebordosa et al. | 366/129 |
| 2005/0029685 A1 | 2/2005 | Zhao | |
| 2005/0078549 A1 * | 4/2005 | Hamelin | 366/129 |
| 2005/0111296 A1 | 5/2005 | Rutigliano et al. | |
| 2005/0128865 A1 | 6/2005 | Chiappetta | |

FOREIGN PATENT DOCUMENTS

| | | | |
|---|---|---|---|
| EP | 1529471 A1 * | 5/2005 | |
| FR | 2905584 A1 * | 3/2008 | |

* cited by examiner

*Primary Examiner*—Charles E Cooley
(74) *Attorney, Agent, or Firm*—Carter, Schnedler & Warnock, P.A.

(57) ABSTRACT

An immersion blender which includes a motor housing and an elongate shaft housing extending from the motor housing to a blender working end. The working end includes a rotatable mixing tool enclosed in part by a blade guard. A resilient spatula ring is attached to the blade guard as an extension thereof. The spatula ring has a spatula edge and sufficient flexibility to conform to inner surface contours of a mixing vessel. A spatula ring may also be provided as an aftermarket product to fit existing immersion blender models.

8 Claims, 4 Drawing Sheets

IMMERSION BLENDER SPATULA RING

BACKGROUND OF THE INVENTION

The invention relates generally to hand-held immersion blenders, sometimes referred to as hand mixers.

Hand-held immersion blenders are well known, and take the form of a motor housing and an elongate shaft housing extending from the motor housing to a blender working end or mixing end. The blender working end includes a rotatable mixing tool or blade enclosed in part by a blade guard. The shaft housing and blade guard may be made of a hard plastic material, or of stainless steel, and are in some cases of one-piece unitary construction. In many immersion blenders, the blade guard takes the form of a skirt-like shroud which resembles a bell, terminating in a generally circular shroud edge defining an opening for access to the mixing blade. To facilitate mixing, flow slots or apertures are provided in the sides of the skirt-like shroud. In other immersion blenders, the blade guard is reduced basically to a disk above the mixing blade and several downwardly extending legs which together are sufficient to prevent the rotating mixing blade from contacting the walls of a mixing vessel.

During use, the working or mixing end and a portion of the shaft housing are inserted into a mixing vessel, while the blender is held in a user's hand by the motor housing. The mixing vessel may, as examples, be a food mixing bowl, a saucepan on a stove, or a single-serving drinking glass.

SUMMARY OF THE INVENTION

In one aspect, an immersion blender is provided, including a motor housing and an elongate shaft housing extending from the motor housing to a blender working end. The working end includes a rotatable mixing tool enclosed in part by a blade guard. A resilient spatula ring is attached to the blade guard as an extension of the blade guard. The spatula ring has a spatula edge and sufficient flexibility to conform to inner surface contours of a mixing vessel.

In another aspect, a spatula ring is provided for an immersion blender of the type including a motor housing and an elongate shaft housing extending from the motor housing to a blender working end, the working end including a rotatable mixing tool enclosed in part by a blade guard. The spatula ring has an attachment end configured for attachment to the blade guard of the immersion blender as an extension of the blade guard, and has a spatula edge. The spatula ring is made of a resilient material and has sufficient flexibility to conform to inner surface contours of a mixing vessel.

In yet another aspect, an immersion blender is provided, including a motor housing and an elongate shaft housing extending from the motor housing to a blender working end. The working end includes a rotatable mixing tool enclosed in part by a skirt-like shroud terminating in a lower generally circular edge defining an opening for access to the mixing tool. The shroud includes a relatively rigid structural portion immediately adjacent the elongate shaft housing transitioning to a relatively resilient generally cylindrical spatula ring portion adjacent the edge. The spatula ring portion has sufficient flexibility to conform to inner surface contours of a mixing vessel.

DETAILED DESCRIPTION

A problem with conventional hand-held immersion blenders as briefly described hereinabove under the heading "Background of the Invention" is that the curvature of the hard plastic or stainless steel working end of the immersion blender does not match the curvature of the sides of a typical glass or other mixing vessel into which the blender is immersed and, in fact, that would be nearly impossible to do. Consequently, actual contact between the working end of the immersion blender and the side of the glass or mixing vessel is essentially limited to a geometric point, making it difficult to effectively use the immersion blender as a spatula when it is desired to scrape along the sides of the glass.

In embodiments of the invention, a flexible spatula ring, which may take the form of skirt or flange, as examples, is attached to or forms a part of the working end of an immersion blender. The spatula ring flexes to conform to the curvature of the sides of the mixing vessel, and serves as a spatula when mixing. The spatula ring can be provided as a detachable accessory, or integrally molded into or included as part of the basic immersion blender.

Figure 1:
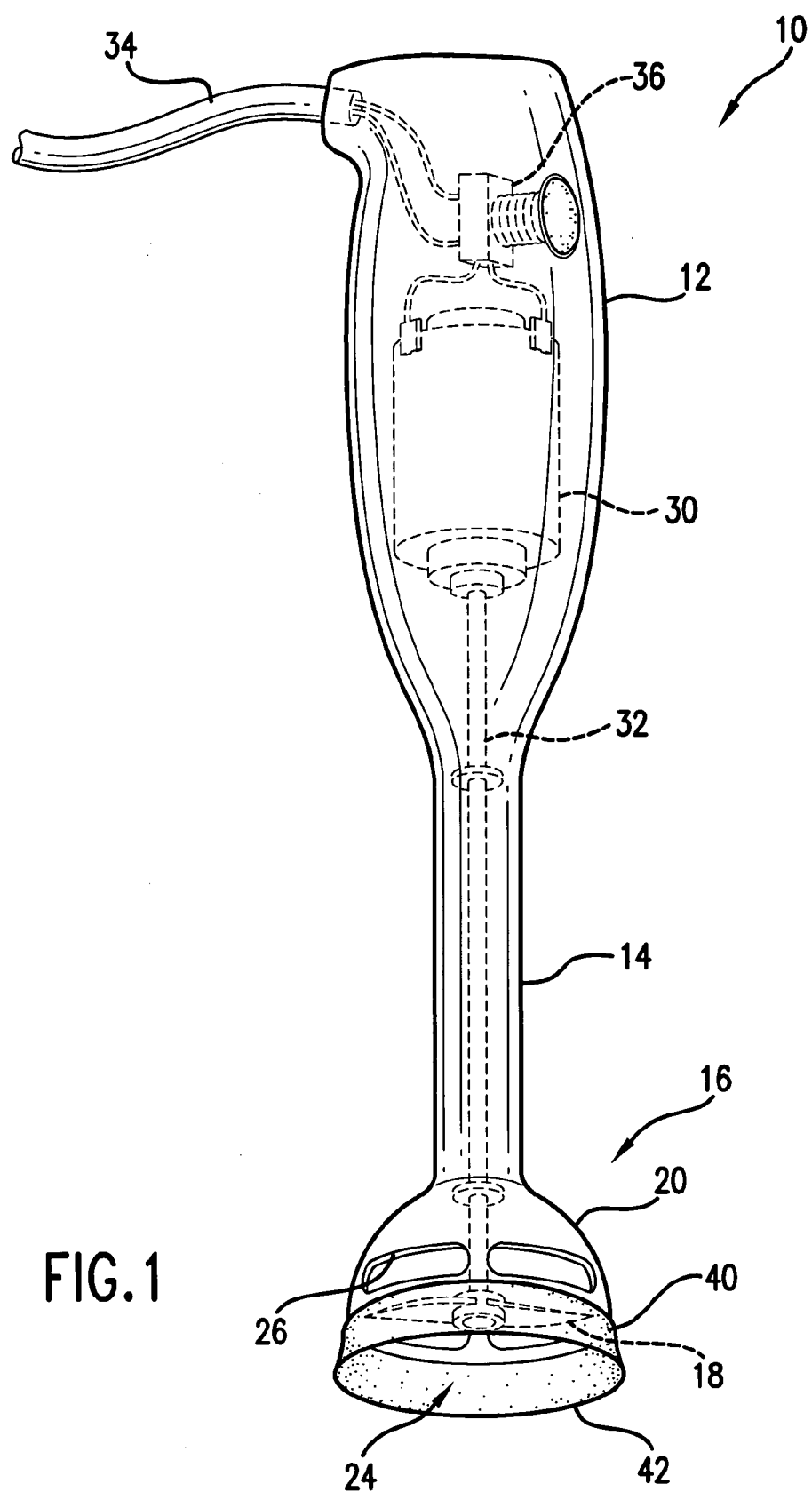
FIG. 1 is a three-dimensional view of an immersion blender including a spatula ring embodying the invention.

Referring now to FIG. 1, an immersion blender 10 includes a motor housing 12 and an elongate shaft housing 14 extending from the motor housing 12 to a blender working end, generally designated 16. The working end 16 is also termed a mixing end 16. The working end 16 includes a rotatable mixing tool 18 or blade 18, enclosed in part by a blade guard 20. In the immersion blender 10 of FIG. 1, the blade guard 20 takes the particular form of a skirt-like shroud 20, which resembles a bell. The shroud 20 terminates in a lower generally circular shroud edge 22 which defines a round opening 24 for access to the mixing tool 18 or blade 18. To facilitate the circulation of material being mixed or blended, apertures in the form of flow slots 26 are formed in the sides of the shroud 20 so that material being mixed flows upward into the opening 24 and out through the flow slots 26, driven by the mixing tool 18 or blade 18 as it rotates.

In other immersion blenders, such as Bamix® hand mixers (not shown), the blade guard 20 is reduced basically to a disk above the mixing blade and several downwardly extending legs. The disk and legs together are sufficient to prevent the rotating mixing blade from contacting the walls of a mixing vessel. The legs also allow the immersion blender to stand on its end.

In the embodiment of FIG. 1, the motor housing 12, elongate shaft housing 14 and shroud 20 are illustrated as though they are of unitary construction, and such is one possibility. Immersion blenders embodying the invention may be provided wherein the motor housing, elongate shaft housing 14 and shroud 20 are separate pieces, or made in other unitary combinations. Various materials or combinations of materials may be employed. The most common materials are hard plastic and stainless steel.

In FIG. 1, basic internal components of the immersion blender are represented in dash lines, including an electric motor 30 driving a rotatable shaft 32 which in turn drives the mixing tool 18. The electric motor 30 is powered via a conventional electric power cord 34, and the operation of the electric motor 30 is controlled by a representative push button switch 36.

Figure 2:
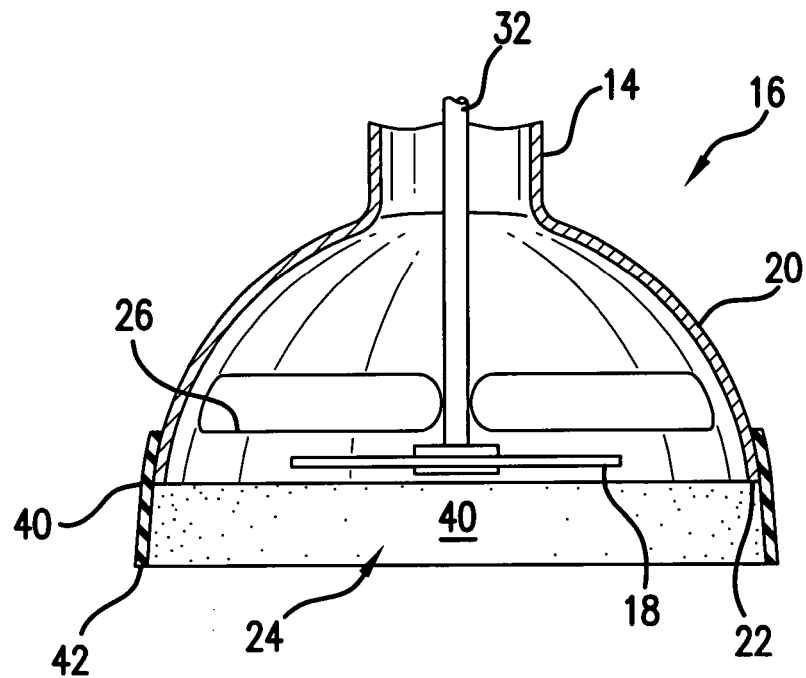
FIG. 2 is an enlarged view, partially in cross section, of the working end of the FIG. 1 immersion blender.

Referring now to FIG. 2, in addition to FIG. 1, a resilient spatula ring 40 is attached to the blade guard 20 as an extension of the blade guard 20. In the particular embodiment illustrated wherein the blade guard 20 takes the form of a skirt-like shroud 20 which resembles a bell, the spatula ring 40 is generally cylindrical and is attached to the shroud 20 as an extension of the shroud 20 beyond the lower shroud edge 22. The spatula ring 40 terminates in a spatula edge 42, and has sufficient flexibility to conform to inner surface contours of a mixing vessel (not shown). The spatula ring 40 may be made of a heat-resistant material, such as a synthetic silicone rubber, for use in mixing hot foods like sauces and gravies, not just cooler foods.

Although the spatula ring 40 is characterized herein as "generally cylindrical," it will be appreciated that, preferably, the spatula ring 40 is slightly flared or belled to enhance effectiveness as a spatula. Alternatively, the spatula ring 40 could be tapered in. The terminology "generally cylindrical spatula ring" is intended to encompass such variations.

The spatula ring 40 of FIG. 2 takes the simple form of an elastic ring, somewhat resembling a wide rubber band, which is retained on the shroud 20 by friction. Adhesive (not shown) may also be employed. The spatula ring 40 may be sold as a part of the immersion blender 10, or may be sold as an add-on accessory, either by the original manufacturer, or as an aftermarket item. Although not shown in FIG. 2, the spatula ring 40 can be provided with a circular inner step on the radially inner surface to limit how far up the spatula ring 40 can slide onto the shroud 20, thereby also serving as a repeatable positioning locator.

Immersion blender spatula rings embodying the invention may be provided in a wide variety of specific forms. By way of example and not limitation, three such forms are illustrated in FIGS. 3, 4 and 5, respectively, briefly described next below.

Figure 3:
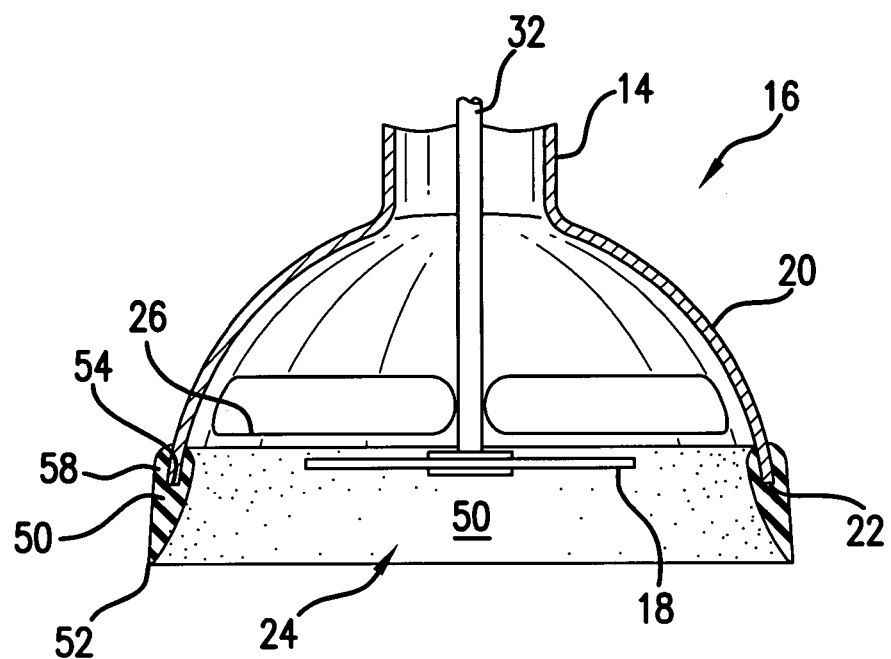
FIG. 3 is a similar view, depicting an alternative embodiment in which the spatula ring has internal and external retaining lips.

In FIG. 3, a spatula ring 50 terminates in a tapered spatula edge 52, and includes an annular slot 54 defined between inner and outer retaining lips 56 and 58. The annular slot 54 receives the lower edge 22 and a portion of the shroud 20. The annular slot 54 and the retaining lips 56 and 58 are dimensioned for sufficient frictional retention. An adhesive (not shown) may also be employed.

Figure 4:
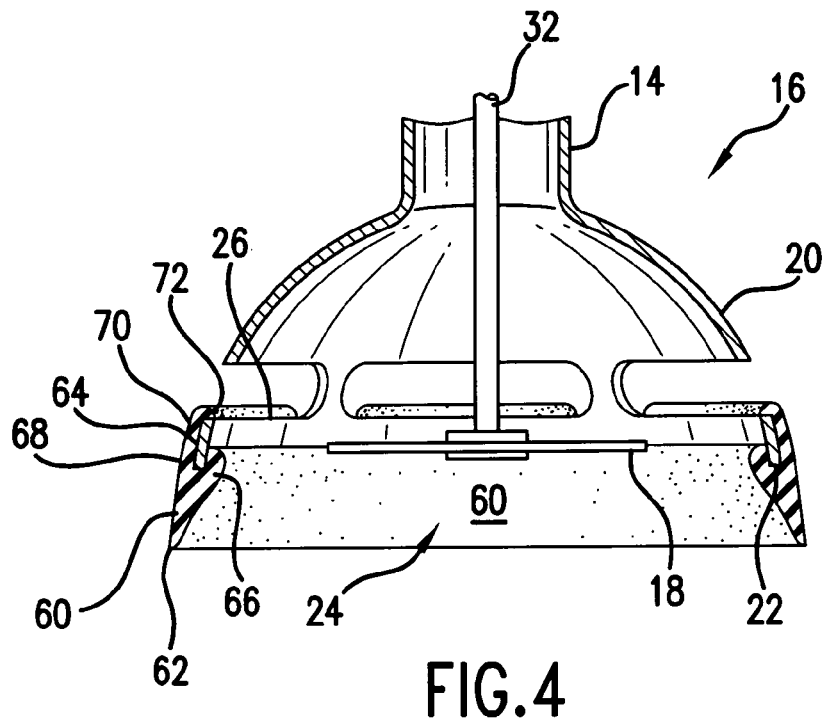
FIG. 4 is a similar view, depicting yet another embodiment, wherein the spatula ring includes projections which clip into the flow slots of the immersion blender.
Figure 5:
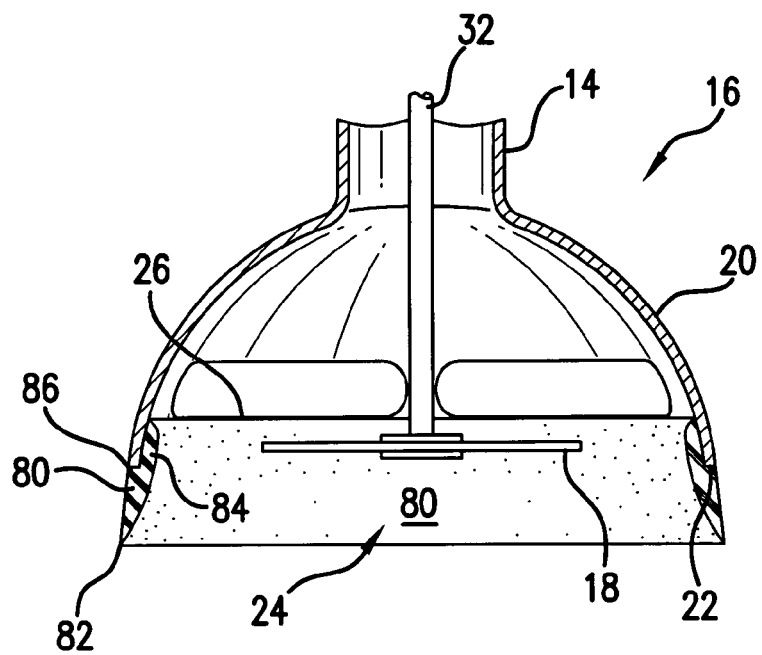
FIG. 5 is a similar view, depicting yet another embodiment, wherein the spatula ring is internally mounted.

In FIG. 4, a spatula ring 60 includes a spatula edge 62, as well as an annular slot 64 between inner and outer retaining lips 66 and 68, generally as described above with reference to the spatula ring 50 of FIG. 3. In order to better retain the spatula ring 60, the spatula ring 60 of FIG. 4 additionally includes a plurality of spaced projections 70 which extend upwardly from the outer retaining lip 68. The projections 70 terminate in hook-like flanges 72 which extend radially inwardly and engage the lower edges of the flow slots 26.

In FIG. 5, a spatula ring 80 again terminates in a spatula edge 82. The spatula ring 80 is somewhat "internally" mounted to the shroud 20, and includes an inner lip 84 defining a step 86 which contacts the lower shroud edge 22. The spatula ring 80 may be adhesively attached.

Again, although four different spatula ring embodiments are illustrated in FIGS. 2, 3, 4 and 5, respectively, it will be appreciated that a variety of forms and attachment methods may be employed, including, inner and outer steps to limit how far the generally cylindrical spatula ring can slide onto the blade guard 20, small lips that prevent the spatula ring from being pulled away from the blade guard 20 in use. Various structures such as clips, rings, springs, notches and "detents" may be provided, as necessary, to adapt to the blade guards of existing immersion blenders to provide aftermarket spatula rings configured to fit existing immersion blender models. An existing immersion blender design may have a minor modification to the blade guard to facilitate attachment of a spatula ring. Spatula rings embodying the invention may be configured to fit immersion blenders other than the immersion blender of FIG. 1, such as immersion blenders wherein the blade guard 20 takes a form other than a skirt-like shroud which resembles a bell. Spatula rings embodying the invention can be a separate piece that detachedly mounts on an immersion blender, or integrally molded or otherwise permanently or fixedly attached to an immersion blender. A spatula ring may be all one homogeneous material, or a spatula ring may employ metal or harder plastic clips or other hardware device for attachment. A spatula ring may mount to the inside or outside of the blade guard or bell, or some combination, with or without positioning steps or lips.

Figure 6:
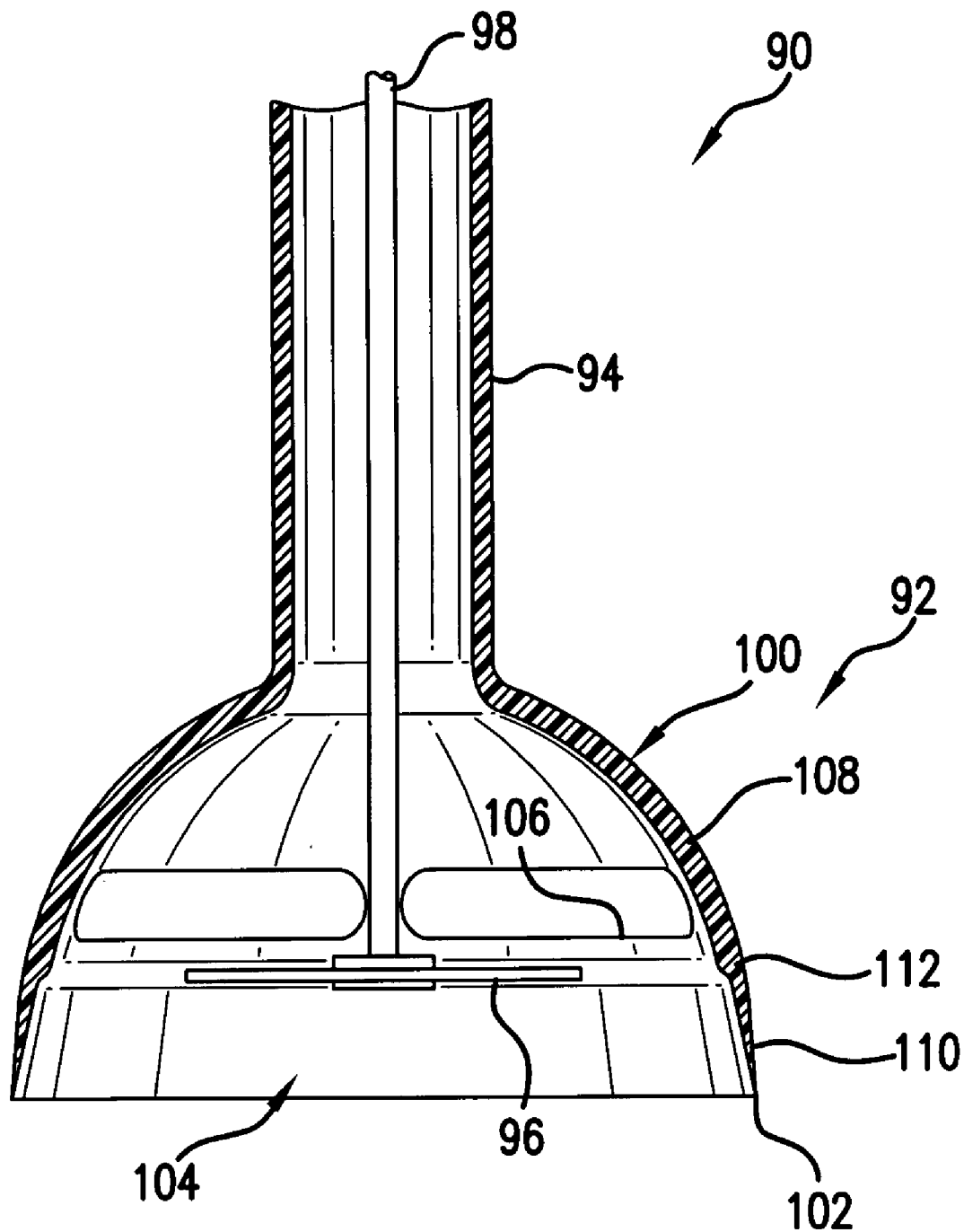
FIG. 6 is a similar view depicting another immersion blender wherein a shroud includes a relatively rigid structural portion transitioning to a relatively resilient generally cylindrical spatula ring portion.

Referring finally to FIG. 6, an immersion blender 90 is represented by its working end 92 or mixing end 92, and a portion of its elongate shaft housing 94. The motor housing and elongate shaft housing 94 of the immersion blender 90 are generally identical to the motor housing 12 and elongate shaft housing 14 of the immersion blender 10 described hereinabove with reference to FIG. 1.

In FIG. 6, the working end 92 includes a rotatable mixing tool 96 or blade 96 driven by a rotatable shaft 98, and enclosed in part by a skirt-like shroud 100 or bell 100 terminating in a lower generally circular shroud edge 102, among other things, defining an opening 104 for access to the mixing tool 96 or blade 96. Apertures in the form of flow slots 106 are provided in the sides of the shroud 100 or bell 100.

The shroud 100 includes a relatively rigid structural portion 108 immediately adjacent the elongate shaft housing 94, transitioning to a relatively resilient generally cylindrical spatula ring portion 110 adjacent the lower shroud edge 102. A transition region between the relatively rigid structural portion 108 and the relatively resilient structural ring portion 110 is generally designated 112. The spatula ring portion 108 has sufficient flexibility to conform to inner surface contours of a mixing vessel (not shown).

The shroud 100 of FIG. 6 is made of a softer plastic, and the difference between the relatively rigid structural portion 108 and the relatively resilient spatula ring portion 110 is provided by a variation in material thickness, since the two are unitary and of the same material. Thus, the material thickness of the spatula ring portion 110 is less than the material thickness of the relatively rigid structural portion 108. As an alternative (not illustrated), the relatively rigid structural portion 108 can be achieved by providing internal stiffening ribs (not shown), rather than a greater wall thickness. As another alternative (not illustrated), the relatively resilient spatula ring portion 110 can be achieved by incorporating slits (not shown) in the edge 102, with or without a reduced wall thickness. The immersion blender 90 is a compromise design, because the relatively rigid structural portion 108 is not as rigid as a shroud which is made of hard plastic or metal, and the relatively resilient spatula ring portion 110 is not as flexible as a rubber spatula ring. Nevertheless, the spatula functionality is provided.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. An immersion blender comprising:
a motor housing;
an elongate shaft housing extending from said motor housing to a blender working end;
said working end including a rotatable mixing tool enclosed in part by a blade guard; and
a resilient spatula ring attached to said blade guard as an extension of said blade guard, said spatula ring having a spatula edge and sufficient flexibility to conform to inner surface contours of a mixing vessel.

2. The immersion blender of claim 1, wherein said spatula ring is capable of being repeatedly attached to and detached from said blade guard as an accessory.

3. The immersion blender of claim 1, wherein said spatula ring is an integral part of said immersion blender.

4. The immersion blender of claim 1, wherein:
said blade guard comprises a skirt-like shroud terminating in a lower generally circular shroud edge defining an opening for access to said mixing tool; and
said spatula ring is generally cylindrical and is attached to said shroud as an extension of said shroud beyond said shroud edge.

5. A spatula ring for an immersion blender of the type including a motor housing and an elongate shaft housing extending from said motor housing to a blender working end, the working end including a rotatable mixing tool enclosed in part by a blade guard, said spatula ring:
made of a resilient material;
having an attachment end configured for attachment to the blade guard of the immersion blender as an extension of the blade guard;
having a spatula edge; and
having sufficient flexibility to conform to inner surface contours of a mixing vessel.

6. The spatula ring of claim 5, which is generally cylindrical.

7. An immersion blender comprising:
a motor housing;
an elongate shaft housing extending from said motor housing to a blender working end; and
said working end including a rotatable mixing tool enclosed in part by a skirt-like shroud terminating in a lower generally circular edge defining an opening for access to said mixing tool;
said shroud including a relatively rigid structural portion immediately adjacent said elongate shaft housing transitioning to a relatively resilient generally cylindrical spatula ring portion adjacent said edge, said spatula ring portion having sufficient flexibility to conform to inner surface contours of a mixing vessel.

8. An immersion blender comprising:
a motor housing;
an elongate shaft housing extending from said motor housing to a blender working end; and
said working end including a rotatable mixing tool enclosed in part by a skirt-like shroud terminating in a lower generally circular edge defining an opening for access to said mixing tool;
said shroud being made of plastic, and including a relatively rigid structural portion immediately adjacent said elongate shaft housing transitioning to a relatively resilient generally cylindrical spatula ring portion adjacent said edge, said spatula ring portion having sufficient flexibility to conform to inner surface contours of a mixing vessel, the material thickness of said spatula ring portion being less than the material thickness of said relatively rigid structural portion.

* * * * *